United States Patent [19]

Miller

[11] Patent Number: 4,743,476

[45] Date of Patent: May 10, 1988

[54] METHOD FOR PRODUCING THERMOPLASTIC ARTICLES HAVING ANTI-STATIC ARMOR

[76] Inventor: Jack V. Miller, 700 N. Auburn Ave., Sierra Madre, Calif. 91024

[21] Appl. No.: 738,302

[22] Filed: May 28, 1985

[51] Int. Cl.⁴ .............................................. B05D 1/18
[52] U.S. Cl. ............................. 427/430.1; 427/385.5; 427/393.1; 427/393.5; 427/434.5
[58] Field of Search ............... 427/430.1, 393.5, 393.1, 427/385.5, 434.5, 346; 252/8.6, 8.9, 518

[56] References Cited

U.S. PATENT DOCUMENTS

| | | | |
|---|---|---|---|
| 2,626,876 | 1/1953 | Carnes | 427/393.1 X |
| 2,715,079 | 8/1955 | Rhodes, Jr. | 427/434.5 X |
| 2,772,189 | 11/1956 | Cohen et al. | 427/393.1 X |
| 3,022,802 | 2/1962 | Lewis | 427/434.5 X |
| 3,423,314 | 1/1969 | Campbell | 252/8.6 |
| 3,814,621 | 6/1974 | Massa | 427/434.5 X |
| 4,082,887 | 4/1978 | Coates | 427/393.1 X |
| 4,115,605 | 9/1978 | Hultman et al. | 427/393.1 X |
| 4,196,001 | 4/1980 | Joseph et al. | 427/393.1 X |
| 4,461,787 | 7/1984 | Savit | 427/393.1 X |

FOREIGN PATENT DOCUMENTS

| | | | |
|---|---|---|---|
| 0460108 | 10/1949 | Canada | 427/393.1 |
| 1222886 | 8/1966 | Fed. Rep. of Germany | 427/393.1 |
| 49-24198 | 6/1974 | Japan | 427/393.1 |
| 58-127741 | 7/1983 | Japan | 427/393.1 |
| 59-091186 | 5/1984 | Japan | 427/393.1 |

*Primary Examiner*—Thurman K. Page
*Attorney, Agent, or Firm*—Christie, Parker & Hale

[57] ABSTRACT

A method for producing thermoplastic articles having an antistatic armor coating comprises: Coating a thermoplastic part with a solution of an organic solvent in which the thermoplastic material is soluble, the organic solvent also including a dissolved surfactant including at least one metallic salt compound, until the solvent solution penetrates the plastic surface.

8 Claims, No Drawings

METHOD FOR PRODUCING THERMOPLASTIC ARTICLES HAVING ANTI-STATIC ARMOR

BACKGROUND OF THE INVENTION

Static electricity generation has been a recognized problem in the use of electrically insulative materials, such as thermoplastics, in the electronics and medical fields. The phenomenon is the result of the elctrical charge occuring due to rubbing or separating generally insulative materials, resulting in the transfer of electrons across the surfaces. When this happens an electrical charge is isolated within the area of generation unless the electrical conductivity of the material is sufficient to dissipate the charge to the surrounding materials or environment.

The two basic systems presently used for electro-static discharge control (ESD) for plastics are: (1) decreasing volume resistivity of the plastic to a value of less than 10 to the 10th ohm centimeters, and (2) decreasing the surface resistivity to less than 10 to the tenth ohms/square. However, since the only available mechanism for dissipating a charge from a part must occur at a surface, decreasing volume resistivity proportionately decreases surface resistivity, controlling ESD.

Reduction of volume resistivity of thermoplastics is presently accomplished by the addition of various conducting materials to the formulation of the plastic resin. Some plastics manufacturers provide plastics that are filled with metallic powder, flakes or fibers, such as copper, stainless steel, aluminum or carbon. This makes the plastic permanently conductive, but has certain disadvantages because of the mechanical properties of the fillers and the relatively high percentage required to achieve sufficient conductivity to control ESD. Such highly loaded plastics have reduced moldability and formability, degraded surface textures, greater susceptibility to water or other liquid absorption, modified or limited coloration (black only in the case of the most commonly used carbon powder fill), and exhibit a tendency to spall off contaminant particles from the surface in a characteristic known as the "crayon effect".

Another method used for controlling ESD by reducing volume resistivity is the addition of hygroscopic surfactants to the formulation of the plastic resin. The presence of the surfactant at the surface will absorb humidity from the air and create an ionic film that is conductive in reasonably normal relative humidity conditions, and is perceptibly greasy or soapy to the touch. The conductive layer is then a thin film of a water solution of surfactant. If it is dried out under heat or very low relative humidity the conductivity may be significantly reduced, approaching the level of the unfilled plastic. Washing or rinsing the surface with nearly any liquid will remove the surface film instantaneously, returning the resistivity to a level comparable to the unfilled plastic and therefore losing all ESD control.

After a period of time more of the surfactant filler will migrate to the surface to re-establish conductivity. Aging and washing or rinsing removes the antistatic properties of these plastics. Analyses were performed of age-failed anti-static materials of this type that no longer had a conductive surface. It was been found that only the surface was non-conductive, and there was an abundance of conductive material just a 0.003 to 0.005 inches below the surface. This indicates clearly that the surfactants used are only capable of migrating a few thousandths of an inch, and the conductivity of the volume of the core of plastic is not significant. The migration of the surfactant is limited to a very thin skin representing the chemical migration distance of the surfactant molecules through the plastic. The disadvantages of ESD control using surfactant fillers are not merely in the poor-to-uncertain aging and cleaning characteristics, but also in significant losses of mechanical properties of the plastic, affecting both the manufacturability and service life of manufactured parts.

The second basic method for ESD control is the application of a topical coating of surfactants to the surface of an otherwise non-conductive plastic part. Since thermoplastics are slightly hygroscopic, the coating (usually a water or alcohol solution of a surfactant) adheres to the plastic in at least a monomolecular layer. Such topical coatings are usually wiped or sprayed onto the plastic. Unfortunately the durability of the coating is approximately proportionate to the thickness of the application. An excess is usually applied, leaving a film of oily residue on the surface that represents a significant contamination problem in clean environments. Such topical coatings are easily removed by heat, age, washing, rinsing and abrasion, and have proven to have a very limited effective life.

Unfortunately, this process is widely used and the plastic parts are often embossed "ANTI-STATIC". Since the embossing is permanent and the topical treatment is not, it is common for sensitive components to be damaged by ESD in a container that is clearly identified as anti-static that has lost its conductivity.

The purpose of the present invention is to provide a method for producing anti-static thermoplastic articles that have long service life without sacrificing the color, appearance, formability and mechanical properties. It is a further purpose of the invention to provide a method for producing thermoplastic articles that have an ESD controlling armor in the form of a penetrating coat that has a thickness at least equal to the chemical migration distance of surfactant volume filled plastics. It is another purpose of this invention to provide a more permanent anti-static surface armor for plastics in which the plastic surface is modified by the inclusion of a hygroscopic metallic salt compound and an additional dry-conductive metallic salt compound.

BRIEF DESCRIPTION OF THE INVENTION

A method for producing thermoplastic articles having antistatic armor comprises coating a thermoplastic part in solution of an organic solvent in which the thermoplastic material is soluble, the organic solvent also including at least one dissolved metallic salt compound in the form of a surfactant.

A preferred embodiment comprises: Immersing a thermoplastic part in a bath containing a solution of an organic solvent in which the thermoplastic material is soluble, the organic solvent also including at least one dissolved conductive metallic salt compound, until the solvent solution has penetrated the surface of the plastic to a depth of at least 0.003 inches.

Another preferred embodiment comprises: Immersing a thermoplastic part in a bath containing a solution of an organic solvent in which the thermoplastic material is soluble, the organic solvent also including a dissolved surfactant and a dry-conductive metallic salt compound.

Yet another preferred embodiment comprises: Immersing a thermoplastic part in a bath containing a solution of an organic solvent in which the thermoplastic material is soluble, the organic solvent also including a dissolved surfactant and a dry-conductive metallic salt compound, and including their application of heat, pressure and/or ultrasound to the bath.

DETAILED DESCRIPTION OF THE INVENTION

The present invention is based on three primary discoveries. First, that the ionic metallic salts, generally comprising surfactants, that are formulated into anti-static thermoplastic resins as volume conductivity additives do not migrate more that a few thousandths of an inch when the surface becomes depleted of these materials. Second, that is was possible to dissolve ionic metallic salt surfactants into a solvent for most thermoplastics and then apply the solvent solution to penetrate the surface of the plastic to a depth comparable to the migration distance of the additives that are used in volume conductive plastics. And third, that it was possible to also dissolve into the solvent metallic salts that are conductive when dry, thereby extending the service life of the anti-static properties and reducing or elminating the necessity of hygroscopic absorption of a surfactant to achieve conductivity.

In application of these three discoveries the inventor has produced and life tested a number of different thermoplastics parts that exhibit anti-static properties equal or superior to presently existing materials. Organic solvents were selected for their ability to attack the specific thermoplastic selected. Each solvent was converted into a solution by dissolving approximately 5% by weight of a surfactant and 5% by weight of a metallic salt that is normally conductive when dry. The plastic parts were then immersed in the solution for a sufficient time to cause the solution to penetrate the plastic surfaces and produce an electrostatically conductive armor to a depth of at least 0.003 inches. In some cases elevated temperatures and pressures, and the application of ultrasound to the bath were used to facilitate the penetration.

Accelerated life tests at elevated temperatures were performed to verify the service life, which was found to be at least comparable to volume filled plastics, and superior to topical coatings. The resulting parts do not exhibit the excessively oily surface characteristic of the surfactant filled and topical coated prior art parts, and the parts made according to the invention do not exhibit the "crayon effect" contamination that is characteristic of most metal or carbon filled plastics.

I claim:

1. A process for producing thermoplastic articles having anti-static armor comprising immersing the article in a solution comprising an organic solvent for the thermoplastic material and at least one dissolved metallic salt for a time sufficient for the dissolved metallic salt to penetrate the surface of the article to a select depth.

2. A process as claimed in claim 1 wherein the select depth is about 0.003 inch.

3. A process as claimed in claim 1 wherein the metallic salt is present in an amount of about 5% by weight of the solution.

4. A process as claimed in claim 1 wherein the solution further comprises a dissolved surfactant.

5. A process as claimed in claim 4 wherein the dissolved surfactant is present in an amount of about 5% by weight of the solution.

6. A process as claimed in claim 1 wherein the metallic salt is a surfactant.

7. A process as claimed in claim 1 wherein the solution is heated to a select temperature.

8. A process as claimed in claim 1 further comprising applying ultrasonic energy to the solution while the thermoplastic article is immersed in the solution.

* * * * *